United States Patent
Uchida et al.

(10) Patent No.: US 8,216,724 B2
(45) Date of Patent: Jul. 10, 2012

(54) POLYMER ELECTROLYTE AND BATTERY

(75) Inventors: Yuji Uchida, Fukushima (JP); Takahiro Endo, Fukushima (JP); Tomoyuki Nakamura, Fukushima (JP); Takeru Yamamoto, Fukushima (JP); Takehiko Suwa, Fukushima (JP); Yoshiaki Naruse, Fukushima (JP)

(73) Assignee: Sony Corporation, Tokyo (JP)

( * ) Notice: Subject to any disclaimer, the term of this patent is extended or adjusted under 35 U.S.C. 154(b) by 809 days.

(21) Appl. No.: 11/908,454

(22) PCT Filed: Mar. 10, 2006

(86) PCT No.: PCT/JP2006/304746
§ 371 (c)(1),
(2), (4) Date: Jan. 26, 2009

(87) PCT Pub. No.: WO2006/098240
PCT Pub. Date: Sep. 21, 2006

(65) Prior Publication Data
US 2009/0202918 A1 Aug. 13, 2009

(30) Foreign Application Priority Data
Mar. 14, 2005 (JP) ................ P2005-071629
Mar. 14, 2005 (JP) ................ P2005-071630

(51) Int. Cl.
*H01M 6/18* (2006.01)
(52) U.S. Cl. ........ 429/323; 429/317; 429/303; 429/306; 429/300
(58) Field of Classification Search .......... 429/323, 429/317, 303, 306, 300
See application file for complete search history.

(56) References Cited

U.S. PATENT DOCUMENTS

2006/0204858 A1 * 9/2006 Hasumi et al. ............. 429/342

FOREIGN PATENT DOCUMENTS

| JP | 07-099060 | | 4/1995 |
|----|----|----|----|
| JP | HEI 07-099060 | A | 4/1995 |
| JP | 10-050141 | | 2/1998 |
| JP | HEI 10-050141 | A | 2/1998 |
| JP | 2001-200125 | | 7/2001 |
| JP | 2001-200126 | | 7/2001 |
| JP | 2001-283916 | | 10/2001 |
| JP | 2001-283916 | A | 10/2001 |
| JP | 2002-100406 | * | 4/2002 |
| JP | 2002-100406 | A | 4/2002 |
| JP | 2004-079310 | | 3/2004 |

(Continued)

OTHER PUBLICATIONS

Japanese Patent Office, Office Action issued in Patent Application JP 2005-071630, on Dec. 15, 2009.

(Continued)

*Primary Examiner* — Laura Weiner
(74) *Attorney, Agent, or Firm* — SNR Denton US LLP

(57) ABSTRACT

A polymer electrolyte capable of obtaining superior discharge characteristics and a battery using it are provided. A cathode (21) and an anode (22) are wound with a separator (24) in between. After that, the wound body is contained inside a package member. Then, an electrolytic composition containing a solvent, polyvinyl acetal or the derivative thereof, and lithium hexafluorophosphate is added thereto. Polyvinyl acetal or the derivative thereof is polymerized by using lithium hexafluorophosphate as a catalyst. Thereby, a polymer electrolyte (23) is formed, and the discharge characteristics are improved.

7 Claims, 3 Drawing Sheets

FOREIGN PATENT DOCUMENTS

| | | |
|---|---|---|
| JP | 2004-079310 A | 3/2004 |
| JP | 2001-2001-125 A | 7/2010 |

OTHER PUBLICATIONS

Database WPI Week 200174; Thompson Scientific London, GB AN 2001-641695 XP002516240.

Database WPI Week 200176; Thompson Scientific London, GB AN 2001-658700 XP002516241.

Database WPI Week 199818; Thompson Scientific London, GB AN 2001-198813 XP002516242.

Database WPI Week 200249; Thompson Scientific London, GB AN 2002-458123 XP002516243.

Database WPI Week 200217; Thompson Scientific London, GB AN 2002-125905 XP002516244.

Database WPI Week 200425; Thompson Scientific London, GB AN 2004-262260 XP002516245.

European Search Report dated Feb. 23, 2009.

International Search Report dated Jun. 13, 2006.

* cited by examiner

POLYMER ELECTROLYTE AND BATTERY

RELATED APPLICATION DATA

This application is a 371 national phase of international application PCT/JP2006/304746 filed in the Japanese Receiving Office on Mar. 10, 2006. The international application and this application claim the benefit of priority to Japanese Patent Applications 2005-071629 and 2005-071630, both of which were filed in the Japanese Patent Office on Mar. 14, 2005.

TECHNICAL FIELD

The present invention relates to a polymer electrolyte containing an electrolytic solution and a polymer compound and a battery using the polymer electrolyte.

BACKGROUND ART

In recent years, many portable electronic devices such as combination cameras (videotape recorder), mobile phones, and portable computers have been introduced, and their size and weight have been reduced. Accordingly, as a portable power source for the electronic devices, batteries, in particular secondary batteries have been actively developed. Specially, lithium ion secondary batteries have attracted attention as a battery capable of realizing a high energy density. For the battery, which is thin, is flexible, and has a shape with a high degree of freedom, many researches have been made.

For such a battery having a shape with a high degree of freedom, all solid-state polymer electrolyte in which an electrolyte salt is dissolved in a polymer compound, a gelatinous polymer electrolyte in which an electrolytic solution is held in a polymer compound or the like is used. Specially, since the gelatinous polymer electrolyte holds an electrolytic solution, the contact characteristics with an active material and the ion conductivity are superior compared to the all solid-state polymer electrolyte. Further, the gelatinous polymer electrolyte produces less liquid leakage than the electrolytic solution. Therefore, the gelatinous polymer electrolyte has attracted attention.

For high molecule used for the gelatinous polymer electrolyte, researches have been made for various materials such as an ether high molecule, methyl methacrylate, and polyvinylidene fluoride. Of these materials, there are high molecules using polyvinyl acetal such as polyvinyl formal and polyvinyl butyral.

For example, in Patent documents 1 and 2, the ion conductive solid composition of matter using polyvinyl butyral is described. In Patent document 3, the gelatinous electrolyte containing polyvinyl formal and an electrolytic solution is described. Further, in Patent document 4, the gelatinous electrolyte in which the amount of the electrolytic solution is increased by adjusting the content of the hydroxyl group in polyvinyl formal is described. Furthermore, in Patent document 5, the gelatinous electrolyte using an epoxy cross-linking agent and a catalyst is described.

Patent document 1: Japanese Unexamined Patent Publication No. S57-143355
Patent document 2: Japanese Unexamined Patent Publication No. S57-143356
Patent document 3: Japanese Unexamined Patent Publication No. H03-43909
Patent document 4: Japanese Unexamined Patent Publication No. 2001-200126
Patent document 5: U.S. Pat. No. 3,985,574

DISCLOSURE OF THE INVENTION

However, in the foregoing polymer electrolyte, there has been a disadvantage that the content of the electrolytic solution is not sufficient, and superior ion conductivity is not able to be obtained.

Further, in Patent documents 1 to 4, the polymer electrolyte therein described are formed by cast method in which polyvinyl acetal is dissolved in a dilute solvent, a film is formed, and then the dilute solvent is volatilized. Therefore, even when a low-boiling solvent is mixed with the electrolytic solution, the low-boiling solvent is volatilized together with the dilute solvent. Consequently, it has been difficult to further improve the ion conductivity.

Furthermore, in the polymer electrolyte described in Patent document 5, there has been a disadvantage that the cross-linking agent with high reactivity or the like is decomposed at the electrode, and thereby the discharge characteristics and the like are lowered.

In view of the foregoing, it is an abject of the invention to provide a polymer electrolyte capable of obtaining superior discharge characteristics by improving the ion conductivity and a battery using the polymer electrolyte.

A first polymer electrolyte of the invention contains: an electrolytic solution containing a solvent and lithium hexafluorophosphate; and a polymer compound having a structure in which at least one from the group consisting of polyvinyl acetal and derivatives thereof is polymerized.

A second polymer electrolyte of the invention contains: an electrolytic solution containing a solvent and lithium hexafluorophosphate; and a polymer compound having a structure in which at least one from the group consisting of polyvinyl acetal and derivatives thereof is polymerized, wherein a content of the polymer compound is within the range from 2 wt % to 5 wt %, both inclusive.

A first battery of the invention includes a cathode, an anode, a separator and a polymer electrolyte inside a package member, wherein the polymer electrolyte contains an electrolytic solution containing a solvent and lithium hexafluorophosphate, and a polymer compound having a structure in which at least one from the group consisting of polyvinyl acetal and derivatives thereof is polymerized.

A second battery of the invention includes a cathode, an anode, a separator and a polymer electrolyte inside a package member, wherein the polymer electrolyte contains: an electrolytic solution containing a solvent and lithium hexafluorophosphate; and a polymer compound having a structure in which at least one from the group consisting of polyvinyl acetal and derivatives thereof is polymerized, and a content of the polymer compound in the polymer electrolyte is within the range from 2 wt % to 5 wt %, both inclusive.

According to the first polymer electrolyte of the invention, lithium hexafluorophosphate is used. Therefore, polyvinyl acetal and the derivative thereof can be polymerized, and even when the ratio of the polymer compound is reduced, liquid leakage can be inhibited. Further, since the ratio of the electrolytic solution can be increased, ion conductivity can be improved. Further, for example, since a low-boiling solvent can be easily contained, ion conductivity can be further improved. In addition, it is not necessary to use a cross-linking agent or the like, and lowering of the discharge capacity due to decomposition reaction of such an agent or the like at the electrode can be inhibited. Therefore, according to the first battery of the invention using such a polymer electrolyte, while inhibiting liquid leakage, the discharge characteristics can be improved.

According to the second polymer electrolyte of the invention, by using lithium hexafluorophosphate, polyvinyl acetal and the derivative thereof is polymerized, and the content of the polymer compound is within the range from 2 wt % to 5 wt %, both inclusive. Therefore, while inhibiting liquid leakage, ion conductivity can be improved. Further, for example, since a low-boiling solvent can be easily contained, ion conductivity can be further improved. In addition, it is not necessary to use a cross-linking agent or the like, and lowering of the discharge capacity due to decomposition reaction of such an agent or the like at the electrode can be inhibited. Therefore, according to the second battery of the invention using such a polymer electrolyte, while inhibiting liquid leakage, the discharge characteristics can be improved.

In particular, when the content of the polymer compound in the polymer electrolyte is in the range from 2 wt % to 3.5 wt %, both inclusive, better effects can be obtained.

BEST MODE FOR CARRYING OUT THE INVENTION

Figure 1:
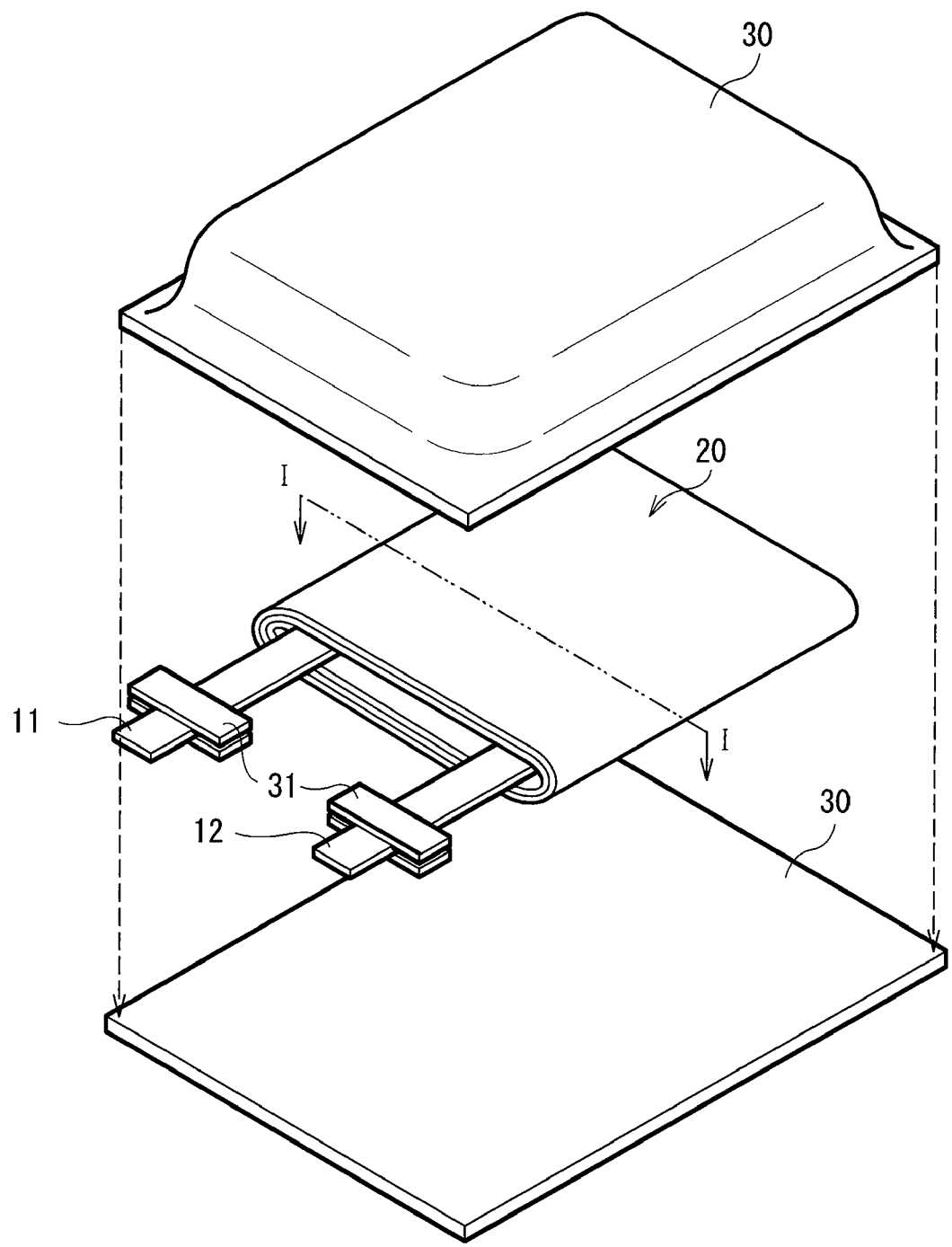
FIG. 1 is an exploded perspective view showing a structure of a secondary battery according to an embodiment of the present invention.

An embodiment of the present invention will be hereinafter described in detail with reference to the drawings.

A polymer electrolyte according to an embodiment of the present invention contains a polymer compound having a structure in which at least one from the group consisting of polyvinyl acetal and the derivatives thereof is polymerized and an electrolytic solution, and is so-called gelatinous.

Polyvinyl acetal is a compound, which contains a constituent unit containing an acetal group shown in Chemical formula 1(A), a constituent unit containing a hydroxyl group shown in Chemical formula 1(B), and a constituent unit containing an acetyl group shown in Chemical formula 1(C) as a repeating unit. Specifically, for example, polyvinyl formal in which R shown in Chemical formula 1(A) is hydrogen, or polyvinyl butyral in which R shown in Chemical formula 1(A) is a propyl group can be cited.

Chemical formula 1

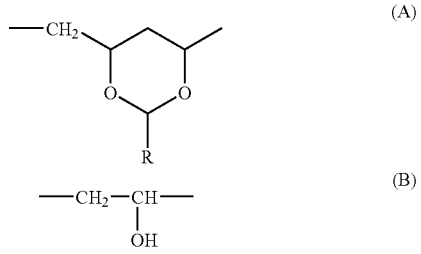

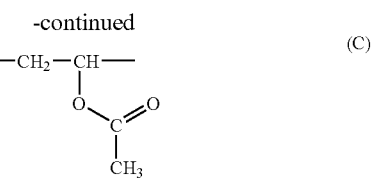

In the formula, R represents a hydrogen atom or an alkyl group with the carbon number from 1 to 3.

The ratio of the acetal group in polyvinyl acetal is preferably in the range from 60 mol % to 80 mol %. In such a range, solubility with a solvent can be improved, and stability of the polymer electrolyte can be further improved. Moreover, the weight average molecular weight of polyvinyl acetal is preferably in the range from 10000 to 500000. When the molecular weight is too low, polymerization reaction is difficult to proceed. Meanwhile, when the molecular weight is too high, the viscosity of the electrolytic solution increases.

The content of the polymer compound is preferably in the range from 2 wt % to 5 wt %, both inclusive to the whole polymer electrolyte, and more preferably in the range from 2 wt % to 3.5 wt %, both inclusive. If the content is low, the ability to hold electrolytic solution may deteriorate. If the content is high, the ratio of electrolytic solution becomes small, leading to the degradation of the ion conductivity.

The polymer compound may be obtained by polymerizing only polyvinyl acetal, by polymerizing only one of the derivatives thereof, or by polymerizing two or more thereof. Further, the polymer compound may be obtained by copolymerizing polyvinyl acetal or the derivative thereof and a monomer other than polyvinyl acetal and the derivatives thereof.

Further, the polymer compound is obtained by polymerization using lithium hexafluorophosphate (LiPF$^6$) as a catalyst, which also functions as an electrolyte salt. Thereby, polymerization is accelerated, and even if the content of the polymer compound is small, the polymer compound can hold the electrolytic solution.

The electrolytic solution is obtained by dissolving an electrolyte salt in a solvent. As a solvent, for example, a nonaqueous solvent such as a lactone solvent such as γ-butyrolactone, γ-valerolactone, δ-valerolactone, and ε-caprolactone; an ester carbonate solvent such as ethylene carbonate, propylene carbonate, butylene carbonate, vinylene carbonate, dimethyl carbonate, ethyl methyl carbonate, and diethyl carbonate; an ether solvent such as 1,2-dimethoxyethane, 1-ethoxy-2-methoxyethane, 1,2-diethoxyethane, tetrahydrofuran, and 2-methyl tetrahydrofuran; a nitrile solvent such as acetonitrile; a sulfolane solvent, phosphoric acids, a phosphoric ester solvent, and pyrrolidones can be cited. One of the solvents may be used singly, or two or more thereof may be used by mixing.

Any electrolyte salt which is dissolved in the solvent and generates ions may be used. It is possible to mix other electrolyte salt with the foregoing lithium hexafluorophosphate. Examples of other electrolyte salt are lithium tetrafluoroborate (LiBF$_4$), lithium hexafluoroarsenate (LiAsF$_6$), lithium perchlorate (LiClO$_4$), lithium trifluoromethanesulfonate (LiCF$_3$SO$_3$), imide lithium bis(trifluoromethanesulfonyl) (LiN(CF$_3$SO$_2$)$_2$), imide lithium bis(pentafluoroethanesulfonyl) (LiN(C$_2$F$_5$SO$_2$)$_2$), methyl lithium tris(trifluoromethanesulfonyl) (LiC(CF$_3$SO$_2$)$_3$), lithium aluminate tetrachloride (LiAlCl$_4$), lithium hexafluorosilicate (LiSiF$_6$) or the like.

The polymer electrolyte is used for a battery as follows, for example. In this embodiment, descriptions will be given of a battery using lithium as an electrode reactant.

FIG. 1 is an exploded view of a secondary battery using the polymer electrolyte according to this embodiment. In the secondary battery, a battery element 20 on which a cathode terminal 11 and an anode terminal 12 are attached is enclosed inside a film package member 30. The cathode terminal 11 and the anode terminal 12 are respectively directed from inside to outside of the package member 30 in the same direction, for example. The cathode terminal 11 and the anode terminal 12 are respectively made of a metal material such as aluminum (Al), copper (Cu), nickel (Ni), and stainless.

The package member 30 is made of a rectangular laminated film, in which, for example, a nylon film, an aluminum foil, and a polyethylene film are bonded together in this order. The package member 30 is arranged, for example, so that the polyethylene film side and the battery element 20 are opposed, and the respective outer edges are contacted to each other by fusion bonding or an adhesive. Adhesive films 31 to protect from outside air intrusion are inserted between the package member 30 and the cathode terminal 11, the anode terminal 12. The adhesive film 31 is made of a material having contact characteristics to the cathode terminal 11 and the anode terminal 12. For example, when the cathode terminal 11 and the anode terminal 12 are made of the foregoing metal material, the adhesive film 31 is preferably made of a polyolefin resin such as polyethylene, polypropylene, modified polyethylene, and modified polypropylene.

The package member 30 may be made of a laminated film having other structure, a polymer film such as polypropylene, a metal film or the like, instead of the foregoing laminated film.

Figure 2:
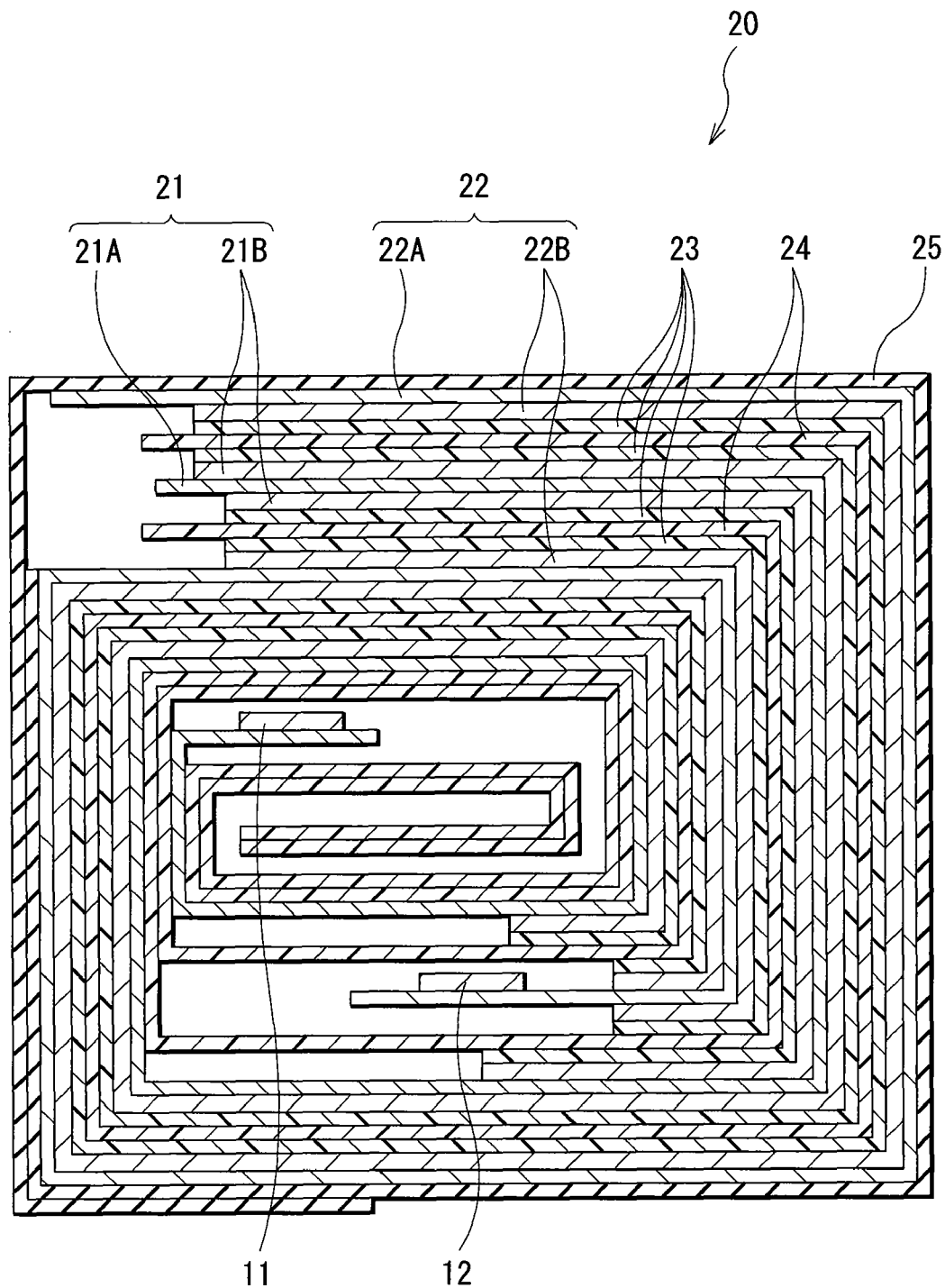
FIG. 2 is a cross section taken along line I-I of a battery element shown in FIG. 1.

FIG. 2 shows a cross sectional structure taken along line I-I of the battery element 20 shown in FIG. 1. In the battery element 20, a cathode 21 and an anode 22 face each other with a polymer electrolyte 23 of this embodiment and a separator 24 in between and wound. The outermost periphery thereof is protected by a protective tape 25.

The cathode 21 has a structure that, for example, a cathode active material layer 21B is provided on the both faces or the single face of a cathode current collector 21A having a pair of opposed faces. In the cathode current collector 21A, there is an exposed portion at one end in the longitudinal direction, which is not provided with the cathode active material layer 21B. The cathode terminal 11 is attached to the exposed portion. The cathode current collector 21A is made of a metal foil such as an aluminum foil, a nickel foil, and a stainless foil.

The cathode active material layer 21B contains, for example, as a cathode active material, one or more cathode materials capable of inserting and extracting lithium. If necessary, the cathode active material layer 21B may contain an electrical conductor and a binder. As a cathode material capable of inserting and extracting lithium, for example, a chalcogenide not containing lithium such as titanium sulfide ($TiS_2$), molybdenum sulfide ($MoS_2$), niobium selenide ($NbSe_2$), and vanadium oxide ($V_2O_5$); a lithium containing compound which contains lithium; or a polymer compound such as polyacetylene and polypyrrole can be cited.

Specially, the lithium containing compound is preferable since some lithium containing compounds can obtain a high voltage and a high energy density. As such a lithium containing compound, for example, a complex oxide containing lithium and transition metal elements, or a phosphate compound containing lithium and transition metal elements can be cited. In particular, a compound containing at least one of cobalt (Co), nickel, manganese (Mn), and iron (Fe) is preferable, since such a compound can obtain a higher voltage. The chemical formula thereof is expressed as, for example, $Li_xMIO_2$ or $Li_yMIIPO_4$. In the formula, MI and MII represent one or more transition metal elements. Values of x and y vary according to charge and discharge states of the battery, and are generally in the range of $0.05 \leq x \leq 1.10$ and $0.05 \leq y \leq 1.10$.

A specific example of the complex oxide containing lithium and transition metal elements includes a lithium-cobalt complex oxide ($Li_xCoO_2$), a lithium-nickel complex oxide ($Li_xNiO_2$), a lithium-nickel-cobalt complex oxide ($Li_xNi_{1-z}Co_zO_2$ (z<1)), lithium-manganese complex oxide having spinel structure ($LiMn_2O_4$) and the like. A specific example of the phosphate compound containing lithium and transition metal elements includes lithium-iron phosphate compound ($LiFePO_4$) or a lithium-iron-manganese phosphate compound ($LiFe_{1-v}Mn_vPO_4$ (v<1)).

Similarly to the cathode 21, the anode 22 has a structure that, for example, an anode active material layer 22B is provided on the both faces or the single face of an anode current collector 22A having a pair of opposed faces. In the anode current collector 22A, there is an exposed portion at one end in the longitudinal direction, which is not provided with the anode active material layer 22B. The anode terminal 12 is attached to the exposed portion. The anode current collector 22A is made of a metal foil such as a copper foil, a nickel foil, and a stainless foil.

The anode active material layer 22B contains, for example, as an anode active material, one or more of anode materials capable of inserting and extracting lithium and metal lithium. If necessary, the anode active material layer 22B may contain an electrical conductor and a binder. As an anode material capable of inserting and extracting lithium, for example, a carbon material, a metal oxide, or a polymer compound can be cited. As a carbon material, a non-graphitizable carbon material, a graphite material and the like can be cited. More specifically, pyrolytic carbons, cokes, graphites, glassy carbons, an organic polymer compound fired body, carbon fiber, activated carbon and the like can be cited. Of the foregoing, cokes include pitch cokes, needle cokes, petroleum cokes and the like. The organic polymer compound fired body is obtained by firing and carbonizing a polymer material such as a phenol resin and a furan resin at an appropriate temperature. As a metal oxide, iron oxide, ruthenium oxide, molybdenum oxide and the like can be cited. As a polymer compound, polyacetylene, polypyrrole and the like can be cited.

As an anode material capable of inserting and extracting lithium, a material which contains at least one of metal elements and metalloid elements capable of forming an alloy with lithium as an element can be also cited. Such an anode material may be a simple substance, an alloy, or a compound of a metal element or a metalloid element, or may have one or more phases thereof at least in part. In the present invention, alloys include an alloy containing one or more metal elements and one or more metalloid elements, in addition to an alloy including two or more metal elements. Further, an alloy may contain nonmetallic elements. The texture thereof includes a solid solution, a eutectic crystal (eutectic mixture), an intermetallic compound, and a texture coexisting two or more intermetallic compounds.

As such a metal element or such a metalloid element, for example, tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y) can be cited. Specially, a metal element or a metalloid element of Group 14 in the long period periodic table is preferable and in particular, silicon and tin are preferable because of a high ability to insert and extract lithium. Thereby, a high energy density can be achieved.

As an alloy of tin, for example, an alloy containing at least one from the group consisting of silicon, nickel, copper, iron, cobalt, manganese, zinc, indium, silver, titanium (Ti), germanium, bismuth, antimony, and chromium (Cr) as a second element other than tin can be cited. As an alloy of silicon, for example, an alloy containing at least one from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

The separator 24 is made of an insulating thin film having high ion transmittance and a given mechanical strength, for example a porous film made of a polyolefin synthetic resin such as polypropylene and polyethylene, and a porous film made of an inorganic material such as a ceramics nonwoven. The separator 24 may have a structure in which two or more above-mentioned porous films are layered. Specially, the separator containing the polyolefin porous film is preferable, since such a separator favorably separates the cathode 21 from the anode 22, and can further reduce internal short circuit and the open circuit voltage reduction.

The secondary battery can be manufactured, for example, as follows.

First, the cathode 21 is formed. For example, when a particulate cathode active material is used, a cathode mixture is prepared by mixing the cathode active material, and if necessary an electrical conductor and a binder. The cathode mixture is dispersed in a dispersion medium such as N-methyl-2-pyrrolidone to form cathode mixture slurry. After that, the cathode current collector 21A is coated with the cathode mixture slurry, which is then dried and compression-molded to form the cathode active material layer 21B.

Further, the anode 22 is formed. For example, when a particulate anode active material is used, an anode mixture is prepared by mixing the anode active material, and if necessary an electrical conductor and a binder. The anode mixture is dispersed in a dispersion medium such as N-methyl-2-pyrrolidone to form anode mixture slurry. After that, the anode current collector 22A is coated with the anode mixture slurry, which is then dried and compression-molded to form the anode active material layer 22B.

Next, the cathode terminal 11 is attached to the cathode 21, and the anode terminal 12 is attached to the anode 22. After that, the separator 24, the cathode 21, the separator 24, and the anode 22 are sequentially layered and wound. The protective tape 25 is adhered to the outermost periphery thereof to form a spirally wound electrode body. Subsequently, the spirally wound electrode body is sandwiched between the package members 30, and peripheral edges of the package members 30 except for one side are thermally fusion-bonded to obtain a pouched state.

After that, an electrolytic composition, which contains at least one monomer of the foregoing polyvinyl acetal and the derivatives thereof, and an electrolytic solution containing lithium hexafluorophosphate is prepared. The electrolytic composition is injected into the spirally wound electrode body from the opening of the package member 30, and is enclosed by thermally fusion-bonding the opening of the package member 30. The monomer is polymerized by using lithium hexafluorophosphate as a catalyst in the package member 30. Thereby, the polymer electrolyte 23 is formed, and the secondary battery shown in FIG. 1 and FIG. 2 is completed. Therefore, a low-boiling solvent can be easily mixed.

Alternatively, the secondary battery may be manufactured as follows. For example, instead of injecting the electrolytic composition after forming the spirally wound electrode body, it is possible that the cathode 21 and the anode 22, or the separator 24 is coated with the electrolytic composition, the lamination is wound, and then the wound body is enclosed inside the package member 30. Otherwise, it is possible that the cathode 21 and the anode 22, or the separator 24 is coated with at least one monomer of polyvinyl acetal and the derivatives thereof, the lamination is wound, the wound body is contained inside the package member 30, and then the electrolytic solution containing lithium hexafluorophosphate is therein injected. These cases are also preferable, since the low-boiling solvent can be easily mixed. However, the monomer is preferably polymerized inside the package member 30, since contact characteristics between the polymer electrolyte 23 and the separator 24 is improved, and the internal resistance can be lowered. Further, the polymer electrolyte 23 is preferably formed by injecting the electrolytic composition into the package member 30, since manufacturing is easily made with few steps.

In the secondary battery, when charged, for example, lithium ions are extracted from the cathode active material layer 21B and inserted in the anode active material layer 22B through the polymer electrolyte 23. When discharged, for example, lithium ions are extracted from the anode active material layer 22B and inserted in the cathode active material layer 21B through the polymer electrolyte 23. Then, lithium ion mobility depends on the electrolytic solution contained in the polymer electrolyte 23. In this embodiment, the ratio of the polymer compound is small, and the ratio of the electrolytic solution is large. Therefore, lithium ions easily move, and high ion conductivity can be obtained.

As above, according to this embodiment, since lithium hexafluorophosphate is used, polyvinyl acetal and the derivatives thereof can be polymerized. Even when the ratio of the polymer compound is decreased, liquid leakage can be inhibited. Further, since the ratio of the electrolytic solution can be increased, the ion conductivity can be improved. Furthermore, for example, since a low-boiling solvent can be easily contained, the ion conductivity can be further improved. In addition, it is not necessary to use a cross-linking agent or the like, and lowering of the discharge capacity due to decomposition reaction of such an agent or the like at the electrode can be inhibited. Therefore, while liquid leakage is inhibited, the discharge characteristics can be improved.

Furthermore, when the content of the polymer compound in the polymer electrolyte 23 is in the range from 2 wt % to 5 wt %, both inclusive, specifically in the range from 2 wt % to 3.5 wt %, both inclusive, better effects can be obtained.

EXAMPLES

Further, specific examples of the present invention will be hereinafter described in detail.

Example 1-1

The laminated film type secondary battery as shown in FIGS. 1 and 2 was fabricated.

First, 0.5 mol of lithium carbonate ($Li_2CO_3$) and 1 mol of cobalt carbonate ($CoCo_3$) were mixed. The mixture was fired for 5 hours at 900 deg C. in the air to synthesize lithium-cobalt complex oxide ($LiCoO_2$) as a cathode active material. Next, 85 parts by weight of the lithium-cobalt complex oxide, 5 parts by weight of graphite as an electrical conductor, and 10 parts by weight of polyvinylidene fluoride as a binder were mixed to prepare a cathode mixture. The cathode mixture was dispersed in N-methyl-2-pyrrolidone as a dispersion medium to form cathode mixture slurry. Subsequently, the both faces of the cathode current collector 21A made of an aluminum foil being 20 μm thick were uniformly coated with the cathode mixture slurry, which was then dried and compression-molded by a roll pressing machine to form the cathode active material layer 21B, and form the cathode 21. After that, the cathode terminal 11 was attached to the cathode 21.

Further, for the anode active material, pulverized graphite powder was used. 90 parts by weight of the graphite powder and 10 parts by weight of polyvinylidene fluoride as a binder were mixed to prepare an anode mixture. After that, the anode mixture was dispersed in N-methyl-2-pyrrolidone as a dispersion medium to form anode mixture slurry. Subsequently, the both faces of the anode current collector 22A made of a copper foil being 15 μm thick were uniformly coated with the anode mixture slurry, which was then dried and compression-molded to form the anode active material layer 22B, and form the anode 22. After that, the anode terminal 12 was attached to the anode 22.

Subsequently, the formed cathode 21 and the formed anode 22 were contacted with the separator 24 made of a microporous polyethylene film being 25 μm thick in between, the lamination was wound in the longitudinal direction, the protective tape 25 is adhered to the outermost periphery to form a spirally wound electrode body. Next, the spirally wound electrode body was sandwiched between the package members 30, and peripheral edges of the package members 30 except for one side were bonded together to obtain a pouched state. For the package member 30, a dampproof aluminum laminated film in which a nylon film being 25 μm thick, an aluminum foil being 40 μm thick, and a polypropylene film being 30 μm thick were layered sequentially from the outermost layer was used.

After that, an electrolytic composition was injected from the opening of the package member 30, and the opening was thermally fusion-bonded under depressurization to enclose the electrolytic composition. After that, in order to keep a constant battery shape, the resultant was sandwiched between glass plates and was left for 24 hours. Thereby, the polymer electrolyte 23 was formed, and the secondary battery shown in FIGS. 1 and 2 was fabricated.

For the electrolytic composition, a mixed solution formed by mixing and dissolving polyvinyl formal and an electrolytic solution at a weight ratio of polyvinyl formal:electrolytic solution=3:97 was used. At that time, the electrolytic solution was obtained by dissolving lithium hexafluorophosphate at a concentration of 1.0 mol/l in a mixed solvent of ethylene carbonate and diethyl carbonate at a weight ratio of ethylene carbonate:diethyl carbonate=3:7. For polyvinyl formal, the weight average molecular weight was about 50000 and the mol ratio among a formal group, a hydroxyl group, and an acetyl group was formal group:hydroxyl group:acetyl group=75.5:12.3:12.2.

Further, part of the electrolytic composition and part of the formed polymer electrolyte 23 were extracted. The extracted portions were respectively diluted three hundredfold with N-methyl-2-pyrrolidone, and analyzed by GPC (Gel Permeation Chromatography) dedicated system (Shodex GPC-101 manufactured by Showa Denko KK). In the result, the weight average molecular weights of the electrolytic composition and the polymer electrolyte 23 were respectively 49000 and 350000. That is, it was confirmed that polyvinyl formal was polymerized.

As Comparative example 1-1 relative to Example 1-1, a secondary battery was fabricated in the same manner as in Example 1-1, except that lithium perchlorate was used instead of lithium hexafluorophosphate. Further, as Comparative example 1-2, a secondary battery was fabricated in the same manner as in Example 1-1, except that polyvinyl formal was not mixed.

For the fabricated secondary batteries of Example 1-1 and Comparative examples 1-1, 1-2, liquid leakage test was performed as follows. First, for Example 1-1 and Comparative examples 1-1, 1-2, 20 pcs of the secondary batteries were fabricated, respectively. A hole being 0.5 mm in diameter was made in the package member 30, and the batteries were pressed at a pressure of 9.8 MPa. Then, the number of the batteries from which the electrolytic solution was leaked was obtained. The results are shown in Table 1.

Further, the discharge capacity was examined as follows. First, 500 mA constant current and constant voltage charge was performed at 23 deg C. for 2 hours to the upper limit voltage of 4.2 V. Next, 100 mA constant current discharge was performed to the final voltage of 3.0 V, and the discharge capacity was then obtained. Further, constant current and constant voltage charge was performed under the similar conditions, 1500 mA constant current discharge was performed to the final voltage of 3.0 V, and the discharge capacity was then obtained. The results are shown in Table 1.

TABLE 1

| | Electrolyte salt | Mixing amount of polyvinyl formal (wt %) | Liquid leakage test (No. of pcs) | Capacity in 100 mA discharge (mAh) | Capacity in 1500 mA discharge (mAh) |
|---|---|---|---|---|---|
| Example 1-1 | Lithium hexafluorophosphate | 3 | 0 | 511 | 460 |
| Comparative example 1-1 | Lithium perchlorate | 3 | 20 | 496 | 425 |
| Comparative example 1-2 | Lithium hexafluorophosphate | 0 | 20 | 516 | 471 |

As evidenced by Table 1, in Example 1-1, in which polyvinyl formal was polymerized by using lithium hexafluorophosphate, liquid leakage of the electrolytic solution was not shown. Meanwhile, in Comparative example 1-1, in which lithium perchlorate was used instead of lithium hexafluorophosphate or in Comparative example 1-2, in which polyvinyl formal was not used, liquid leakage of the electrolytic solution was shown. Further, in Example 1-1, in which polyvinyl formal was polymerized, a discharge capacity equal to of Comparative example 1-2, in which polyvinyl formal was not used could be obtained.

That is, it was found that when polyvinyl formal was polymerized by using lithium hexafluorophosphate, liquid leakage of the electrolytic solution was inhibited while the discharge characteristics could be improved.

Examples 2-1 and 2-2

Secondary batteries were fabricated in the same manner as in Example 1-1, except that as the separator 24, a microporous polypropylene film being 25 μm thick or a polyethylene nonwoven being 25 μm thick was used.

For the fabricated secondary batteries of Examples 2-1 and 2-2, liquid leakage test was performed and the discharge capacity was obtained in the same manner as in Example 1-1. The results are shown together with the results of Example 1-1 in Table 2.

TABLE 2

| Separator | | Liquid leakage test (No. of pcs) | Capacity in 100 mA discharge (mAh) | Capacity in 1500 mA discharge (mAh) |
|---|---|---|---|---|
| Example 1-1 | Microporous polyethylene film | 0 | 511 | 460 |
| Example 2-1 | Microporous polypropylene film | 0 | 508 | 452 |
| Example 2-2 | Polyethylene nonwoven | 0 | 501 | 448 |

As evidenced by Table 2, according to Examples 1-1 and 2-1, in which the microporous polyethylene film or the microporous polypropylene film as a porous film was used, higher values were shown for the discharge capacity than in Example 2-2, in which the nonwoven was used.

That is, it was found that the separator 24 preferably contained a porous film containing at least one of polyethylene and polypropylene.

Examples 3-1-3-7

In Examples 3-1 to 3-6, the polymer electrolyte 23 and secondary batteries were formed in the same manner as in Example 1-1, except that as the electrolytic composition, mixed solution formed by mixing and dissolving polyvinyl formal and an electrolytic solution at a weight ratio of polyvinyl formal:electrolytic solution=1.5:98.5, 2:98, 3:97, 3.5: 96.5, 4:96, 5:95 or 6:94 was used. Polyvinyl formal and an electrolytic solution similar to Example 1-1 were used.

As in Example 1-1, part of the electrolytic composition and part of the formed polymer electrolyte 23 used in Examples 3-1 to 3-6 were extracted and analyzed by GPC dedicated system. In the result, the weight average molecular weights of the polymer electrolyte 23 were larger than that of the electrolytic composition. That is, it was confirmed that polyvinyl formal was polymerized.

In Example 3-7, a secondary battery in which the content of polyvinyl formal in the polymer electrolyte 23 was 10 wt % was fabricated. Specifically, the battery was fabricated as follows.

At first, cast liquid was prepared by mixing electrolytic solution, polyvinyl formal and tetrahydrofuran as mixed solvent at a weight ratio of electrolytic solution:polyvinyl formal:tetrahydrofuran=90:10:100. For the electrolytic solution, a solution formed by dissolving lithium hexafluorophosphate of 1.0 mol/l in a mixed solvent of ethylene carbonate and propylene carbonate at a weight ratio of ethylene carbonate:propylene carbonate=1:1 was used. Subsequently, as in the same manner as Example 1-1, the cast solution was applied to both faces of cathode 21 and anode 22, which was dried at 50 deg C. to volatilize tetrahydrofuran, thereby forming the polymer electrolyte 23. After that, the cathode 21 formed with the polymer electrolyte 23 and the anode 22 formed with the polymer electrolyte 23 were laminated and wound, and placed between the package member 30 similar to Example 1-1. Then, four sides of the resultant were closed by thermal fusion bonding, thereby fabricating the secondary battery.

For the fabricated secondary batteries of Examples 3-1 to 3-7, liquid leakage test was performed and the discharge capacity was obtained in the same manner as in Example 1-1. The results are shown together with the results of Example 1-1 and Comparative example 1-2 in Table 3 and FIG. 3.

TABLE 3

| | Electrolyte salt | Mixing amount of polyvinyl formal (wt %) | Liquid leakage test (No. of pcs) | Capacity in 100 mA discharge (mAh) | Capacity in 1500 mA discharge (mAh) |
|---|---|---|---|---|---|
| Example 3-1 | Lithium hexafluorophosphate | 1.5 | 5 | 515 | 469 |
| Example 3-2 | | 2 | 0 | 509 | 465 |
| Example 1-1 | | 3 | 0 | 511 | 460 |
| Example 3-3 | | 3.5 | 0 | 506 | 452 |
| Example 3-4 | | 4 | 0 | 502 | 439 |
| Example 3-5 | | 5 | 0 | 501 | 435 |
| Example 3-6 | | 6 | 0 | 498 | 378 |
| Example 3-7 | | 10 | 0 | 482 | 313 |
| Comparative example 1-1 | Lithium hexafluorophosphate | 0 | 20 | 516 | 471 |

Figure 3:
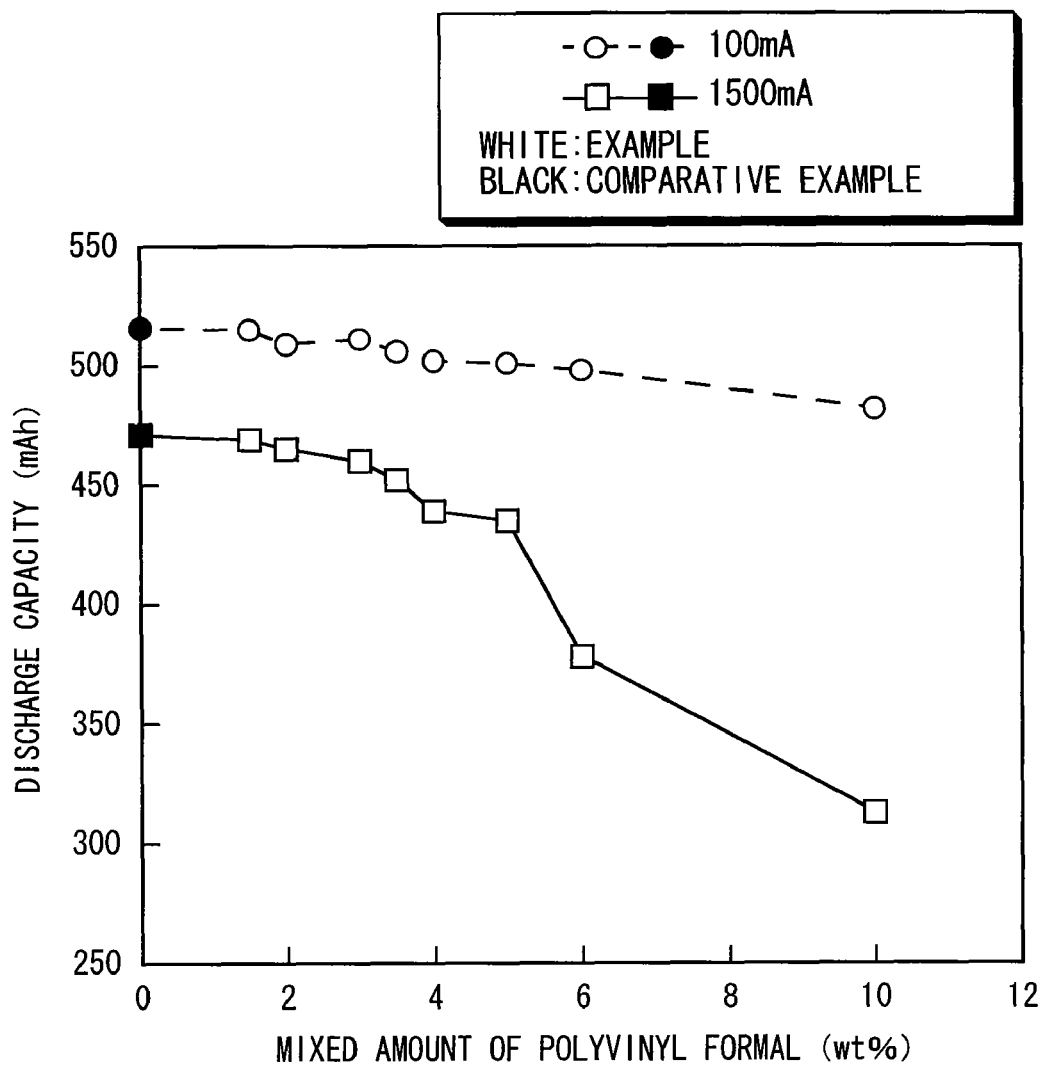
FIG. 3 is a characteristic diagram showing a relation between mixed amount of polyvinyl formal and discharge capacity.

As evidenced by Table 3 and FIG. 3, in Examples 1-1 and 3-1 to 3-7 in which polyvinyl formal was polymerized by using lithium hexafluorophosphate, liquid leakage of the electrolytic solution was less than Comparative example 1-2 in which polyvinyl formal was not used. In particular, in Examples 1-1 and 3-2 to 3-7 in which the mixed amount of polyvinyl formal was 2.0 wt % or more, no leakage of electrolytic solution was observed for all the batteries. Further, in Examples 3-6 and 3-7 in which the mixed amount of polyvinyl formal was more than 5 wt %, the discharge capacity was decreased compared to Examples 1-1 and 3-1 to 3-5, and in Example 3-7 in which the battery was fabricated by casting, the discharge capacity was decreased significantly. Furthermore, in Examples 1-1, 3-2 and 3-3 in which the mixed amount of polyvinyl formal was in the range from 2 wt % to 3.5 wt %, both inclusive, high discharge capacity was obtained particularly.

In other words, it was found out that when the polyvinyl formal was polymerized by using lithium hexafluorophosphate and the content of the polymerized polymer compound in the polymer electrolyte 23 was in the range from 2 wt % to 5 wt %, both inclusive, leakage could be prevented. In particular, when the content of the polymer compound was in the range from 2 wt % to 3.5 wt %, both inclusive, the discharge capacity was further improved.

The present invention has been described with reference to the embodiment and the examples. However, the present invention is not limited to the foregoing embodiment and examples, and various modifications may be made. For example, in the foregoing embodiment and examples, descriptions have been given of the case provided with the battery element 20 in which the cathode 21 and the anode 22 are layered and wound. However, the present invention can be also applied to the case provided with a tabular battery element in which a pair of a cathode and an anode is layered, or the case provided with a lamination type battery element in which a plurality of cathodes and a plurality of anodes are layered. Further, in the foregoing embodiment and examples, descriptions have been given of the case in which the film package member 30 is used. However, the present invention can be similarly applied to a battery having other shape such as a so-called cylinder type battery, a square type battery, a coin type battery, and a button type battery, which uses a can for the package member. Furthermore, the present invention can be applied to primary batteries in addition to the secondary batteries.

In addition, in the foregoing embodiment and examples, descriptions have been given of the battery using lithium as an electrode reactant. However, the present invention can be also applied to the case using other alkali metal such as sodium (Na) and potassium (K); an alkali earth metal such as magnesium (Mg) and calcium (Ca); or other light metal such as aluminum.

What is claimed is:

1. A polymer electrolyte comprising:
   an electrolytic solution; and
   a polymer compound having a structure in which at least one from the group consisting of polymerized polyvinyl acetal and polymerized polyvinyl acetal derivatives,
   wherein,
      the electrolytic solution comprises a solvent and lithium hexafluorophosphate, and a content of the polymer compound is within the range from 2 wt % to 5 wt %.

2. The polymer electrolyte according to claim 1, wherein the content of the polymer compound is 3.5 wt % or less.

3. A battery comprising:
   a cathode;
   an anode;
   a separator; and
   a polymer electrolyte inside a package member,
   wherein,
      the polymer electrolyte comprises (1) an electrolytic solution containing a solvent and lithium hexafluorophosphate and (2) a polymer compound having a structure in which at least one from the group consisting of a polymerized polyvinyl acetal and polymerized polyvinyl acetal derivatives, and a content of the polymer compound in the polymer electrolyte is within the range from 2 wt % to 5 wt %, both inclusive.

4. The battery according to claim 3, wherein the content of the polymer compound in the polymer electrolyte is 3.5 wt % or less.

5. The battery according to claim 3, wherein the polymer compound is polymerized inside the package member.

6. The battery according to claim 3, wherein the package member is made of a film-shaped material.

7. The battery according to claim 3, wherein the separator includes a porous film containing at least one of polyethylene and polypropylene.

* * * * *